United States Patent [19]

Dietz, Jr.

[11] Patent Number: 5,177,946

[45] Date of Patent: Jan. 12, 1993

[54] RAKE

[75] Inventor: William A. Dietz, Jr., New Paltz, N.Y.

[73] Assignee: Partnership of Dietz, Ferrara and Gilman, Cornwall, N.Y.

[21] Appl. No.: 668,563

[22] Filed: Mar. 13, 1991

[51] Int. Cl.$^5$ .............................................. A01D 7/06
[52] U.S. Cl. .............................. 56/400.16; 56/400.21
[58] Field of Search ........... 56/400.16, 400.17, 400.01, 56/400.21

[56] References Cited

U.S. PATENT DOCUMENTS

| | | | |
|---|---|---|---|
| 2,883,820 | 4/1959 | Bissell | 56/400.17 |
| 3,332,223 | 7/1967 | Polisso | 56/400.17 |
| 4,150,528 | 4/1979 | Rendin | 56/400.16 |
| 4,744,208 | 5/1988 | King | 56/400.17 |

Primary Examiner—Terry Lee Melius
Attorney, Agent, or Firm—Michael G. Gilman

[57] ABSTRACT

A rake having multiple rows of tines in alternating rows alternate in a lateral position and are spaced from each other sidewise. In a preferred embodiment, the rows of tines are so spaced that the tines of one row are individually offset with respect to the tines in the next adjacent row and thus are located substantially between the tines of the next row.

18 Claims, 1 Drawing Sheet

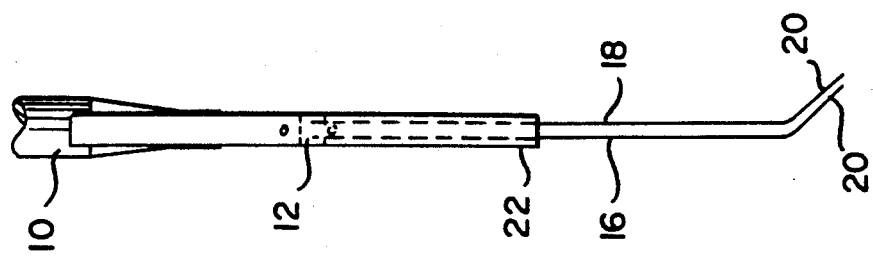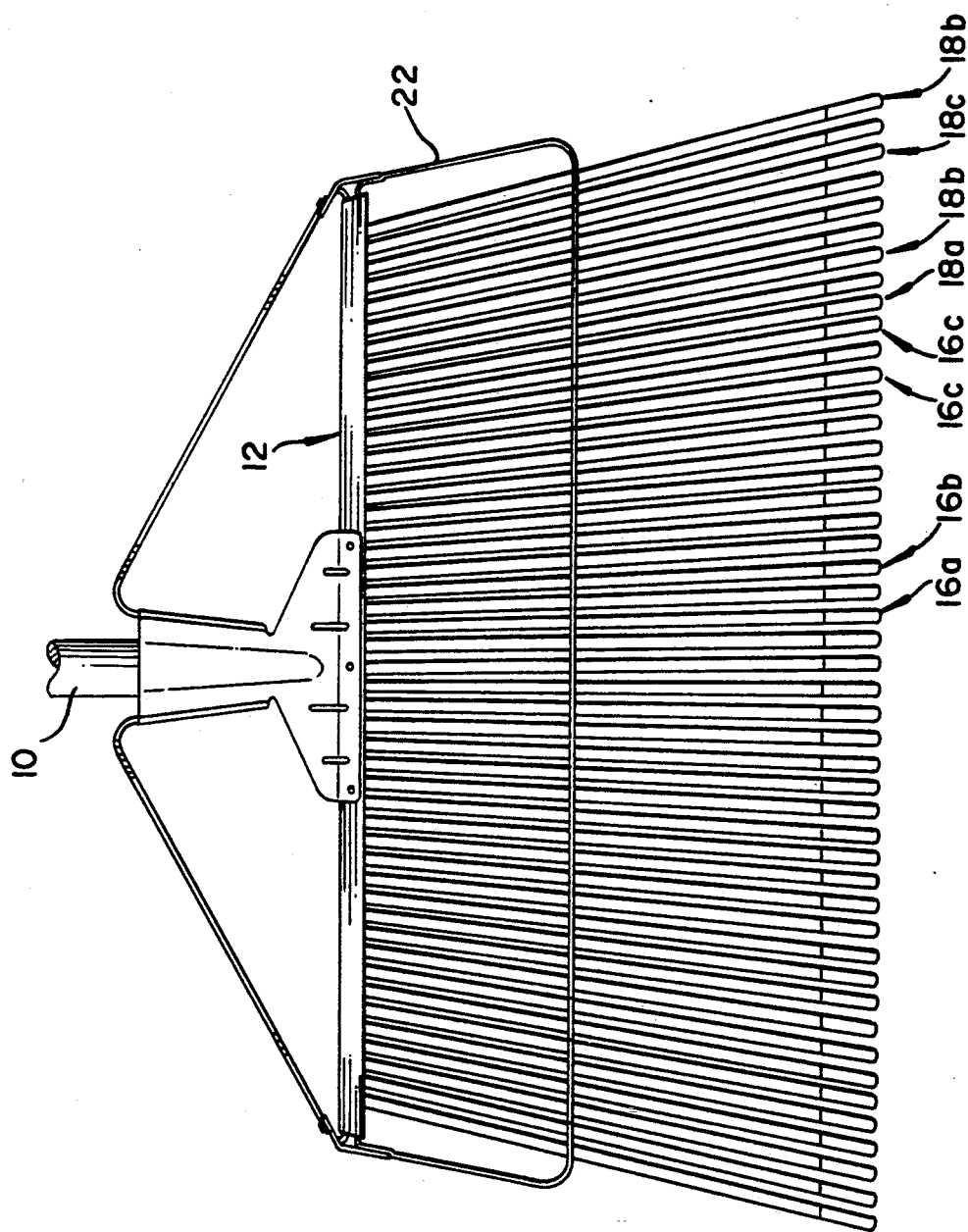

RAKE

This invention is directed to an improved design of a garden rake.

BACKGROUND OF THE INVENTION

A leading manufacturer of garden tools reports its biggest selling item is the garden rake. The traditional garden rakes are designed for raking lawns to remove grass clippings, twigs and leaves. To minimize digging into the soil, the tines are flexible wires or strips of metal, bamboo and plastic, the ends contoured to cradle the raked objects as the rakes are stroked back and forth. The old fashion rakes with rigid wooden spokes or steel spikes are relegated to smoothing the surfaces of earth in garden areas. These are unsuitable for lawns or cut grass.

Rakes with flexible steel tines, a network of wires or steel strips have replaced rakes with shaped bamboo pieces largely because these provide longer service, and cause less damage when raking tender shoots. Rakes made of plastic are popular because they are low in cost by being pressed or molded in one piece. The design of rakes as a whole has been simply to accommodate the action of the tines. The rest of the rake is merely support for the tines.

Manufacturers of plastic rakes have directed their attention to making rakes with elements of tougher plastic. Thus, a wide assortment of plastic rakes are available. The emphasis on applying the new technologies, which are built around plastic materials, are well known. Very little thought appears to have been focused on making a more efficient rake; that is on making the tines do their job more efficiently. An example of one place where a more efficient rake is needed is where one is required to rake off small materials, particularly gravel or cut stone, from a grassy lawn. The presently designed rakes are inefficient in trapping and moving these small objects forward.

Anyone who has had a great deal of experience when confronted with the job of raking small objects has developed strategies to make the raking job better. One way is to change the angle of the stroke from directly back and forth to raking at an oblique angle. This alternative, of angling the tines, causes the apparent gap between the tines to be decreased. Therefore, by operating in this manner, fewer strokes are needed to dig out and move small objects resting on grass. This pattern of raking is useful when a few objects necessitate removal.

It is clear that there is a relationship between the efficiency of movement of the objects being raked and the energy necessary to move the rake through each sweeping cycle. The rake performs its function because of the resiliency of the tines. That is, the sweeping motion of the rake along the ground causes the tines to be bent, by the resistance of the ground, away from the direction of sweeping. As the end of each sweep is reached, and the rake is somewhat lifted from the ground, the resistance of the tines is slackened, and the tines spring back to their normal position. This springing action is the most important component in moving the material being raked in the direction of sweeping.

It will also be clear that, as the tines spring forward, some of the material being swept will pass laterally off the tines, will move into the space between the tines, and will therefore not be subjected to the springing action of the tines. Therefore these pieces of material will not be swept forward. If more tines are included in the same width of rake, or if wider tines are provided, there will be less space between the tines, and the sweeping efficiency will necessarily be greater.

However, if the tines are made wider, they will be less flexible, which will make for lower sweeping efficiency. From this point of view, the ultimate rake is therefore a hoe, which has a single "tine" over its entire width. It will be clear that a hoe is not an efficient tool for the raking of small objects, such as pebbles or grass clippings, from a lawn or the like.

In either case, within a given width of rake, it is known that there is a best balance between the width of the individual tines, the number of tines, and the spacing of the tines which will give the most efficient raking for a given amount of input raking energy. Manufacturers of rakes which are commercially available more or less recognize these parameters.

In many popular versions of rake design, the rakes are equipped with one of two configurations of extended tines. In one design, a number of tines, wires, or strands are bonded together at one end, and the opposite ends are extended fan-shape. The open spaces between the extremities of the bound pieces are anchored by straps or rods. These are usually placed below the point where the end pieces are bunched or bundled together and joined to a suitable handle. The open spaces at the extremities of the tines often vary from about 1 to 1½ inches.

Another arrangement, which often finds application along with the use of steel tines or strips, is to extend all of these tines generally parallel from a single header. In this manner, as many as 24 tines can be attached to 20" header. The tines may be about 10 inches long, and the extremities anchored by a cross-strap to maintain end spacings of about 1 inch. The assembly, or header and the attached tines, is held in a fixed position by straps extending from the header to the yoke where the rake handle is installed.

In any of the usual configurations of rakes, the tines may be relatively straight or may have their ends curved so as to point in the general direction in which it is intended for the rake to move the small materials being raked. The angle of the curved ends makes for greater efficiency in springing the material being raked forward, but, of course has the detriment that it takes more energy on the part of the user to bend the curved tine tip than it would to bend a flat tine tip.

Persons with raking experience recognize the essential differences between a rake with a fan shaped tine assembly, and one where the tines (sometimes about 10 inches in length) extend generally parallel from a single unitized header. Between these two extreme shapes, are some fan shaped units molded of plastic, and others molded as to cause the tines to extend in a generally parallel configuration from a single header or manifold.

SUMMARY OF THIS INVENTION

It is an object of this invention to provide a new and novel rake design which greatly increases the efficiency of raking, because in use, it necessitates fewer strokes to produce the greatest movement of small pieces of material than any of the conventional rake designs.

Another object of this invention is to provide a novel rake design which is more efficient in that it lifts and moves thatched grass clippings more effectively than the conventional designs.

Other and additional objects of this invention will appear from a consideration of this entire specification, including the drawing thereof, as well as the claims appended hereto.

In accord with and fulfilling these objects, one aspect of this invention comprises a rake, particularly a grass rake, with flexible tines in any of the conventional configurations, such as either a generally parallel or in a fan shaped or in some other configuration, wherein, instead of a single row of tines and wires extending from either the handle or a manifold bar, which itself is attached to the handle, there are mounted at least two (2) rows of tines offset from each other in two directions, that is, offset both in the direction of sweeping of the rake and in the direction across the rake. In the direction across the rake, the tines of one row should preferably be so positioned that each at least partially straddles the open spaces between the tines in the other row. In the sweeping direction, the rows of tines should be spaced apart an effective distance up to about one (1) inch.

BRIEF DESCRIPTION OF THE DRAWING

Understanding of this invention will be facilitated by reference to the accompanying drawing in which:

FIG. 1 is a plan view of a rake according to this invention which utilizes two (2) rows of offset tines; and FIG. 2 is a side view of this same rake.

DESCRIPTION OF PREFERRED EMBODIMENTS

Although it is not exactly certain as to why this configuration should be so efficient, actual use of the rake assembly of this invention shows an increase in raking efficiency which is readily perceived to be at least about 3 to 5 times; that is, a rake having the configuration of this invention with twice the number of tines as a standard rake and having the rows of tines offset as required hereby, is much more effective than a similar design with a single row of tines. The effectiveness is much greater than could be caused by the simple increase in the number of tines. The increase in raking efficiency is evident whether the duplicate set of tines have a fan shape configuration or are generally parallel and emanate from a single manifold, provided that the individual tines are indeed offset in two directions.

A rake with multiple sets of tines as required by this invention, may be constructed in a wide variety of assemblies. To illustrate a very simple arrangement, the working parts of two popular, commercial lawn rakes, each with flat steel tines 5/16 inch × 10 inches long, that is the portions which do not include the handles, are welded together to form one single unit, and a single handle is suitably attached thereto. The individual rake assemblies are welded together over each other such that the rows of tines are disposed one behind the other with the handle means generally centrally disposed. Further, the sets of tines are laterally offset from each other so that each tine of each row of tines is disposed to substantially straddle the openings between the tines of the other row.

If desired, one or more additional rows of tines may be further welded to the front or the back of the assembly, again in an offsetting relationship with respect to its next adjacent row of tines. Still further, the rake of this invention may be made in a very simple and straightforward manner by molding a suitable plastic to thereby form the entire structure n a single operation. The handle may be integrally molded or the tine manifold may make provision for late addition of a separate handle.

In one configuration, where more than two rows of tines are provided, the tines in each row are of substantially the same width as the spaces between the tines, and each row of tines is offset from the next adjacent row a distance such that only a portion of the space between the tines of that row is "covered". In this configuration, where there are three (3) or more rows of tines, the rows of tines preferably cumulatively act together to fully cover the space between the tines in the other rows.

In one embodiment of this invention, the number of rows of tines may be substantially proportional to the space between the tines of an adjacent row of tines which is covered. Therefore, for example, if there are three rows of tines, the tines of each row may cover one half of the space between the tines of the next adjacent row; where there are two rows of tines, the tines of each row may cover the whole space between the tines of the other row; and where there are four rows of tines, the tines of each row may cover one third of the space between the tines of the next adjacent row; and so on.

The reasons for the large increase in the efficiency of a rake with the tines arranged in multiple rows instead of a single row are complex and not completely elucidated. Be that as it may, the tremendous boost is raking efficiency is readily perceived in any situation where raking is required or necessary. It may be that material which would normally move off the tines in a lateral direction, and therefore become lost to the rake, becomes immediately subject to the action of the tines of the next row. Further, as the tines spring the material being raked forward, it almost immediately becomes subject to the action of the tines of the next adjacent row of tines. For some reason, this combination acts to greatly enhance the effectiveness of the rake of this invention as compared to conventional rakes.

Referring to this drawing, and particularly to FIGS. 1 and 2 thereof, in which like parts are numbered alike, the rake of this invention comprises a handle 10, and a manifold bar 12 attached to the handle 10. Attached to, and extending, in the direction opposite to the handle 10, from a rearward portion of the manifold bar 12 are a first, rearwardly disposed, series of long tines 16 (16a, 16b, 16c, 16d etc.) which in this illustration, are generally parallel to each other. Attached to, and extending, in the direction opposite to the handle 10, from a forward portion of the manifold bar 12 are a second, forwardly disposed, series of long tines 18 (18a, 18b, 18c, 18d, etc.) which in this illustration, are generally parallel to each other.

The tips of all of the tines, 20, etc. are all curved into the direction which the rake is intended to move materials. It should be noted that the tines extending from the front of the manifold bar 12 are spatially disposed between the tines extending from the rear of the manifold bar 12. Thus each of the tines are spatially separated from all of the tines which are next adjacent thereto. There is also provided in this particularly illustrated embodiment of this invention, a tine spreader 22 which serves to separate the two rows of tines from each other.

Of course, the material from which the rake or the tines thereof is made is not materially limiting on the practice of this invention. Plastic, metal, bamboo, or other wood, or the like all seem to be well suited to use without limitation. Further, in some circumstances, the handle itself may be omitted without departing from the spirit and scope of this invention, for example, where the rake is being dragged by a tractor or other such machinery.

It should be understood that it is within the spirit and scope of this invention for all of the tines of the multiple sets of tines to extend from a common source. Thus, a single manifold bar can have a first series of tines extending therefrom which alternate with a second set of tines extending therefrom at a slightly divergent angle with respect to the first set of tines. The divergence of the angle should be such that at the distant ends of the sets of tines, they are only spaced apart a short distance, that is a distance equivalent to the distance the sets of tines would be spaced apart in the other embodiments of this invention. Of course, in a like manner more than two sets of tines could be made to extend from a common source by properly alternating the tines from that source.

Where necessary, widthwise props can be interposed between the various sets of tines to keep them separate and stable. Multiple props can be used with the prop closest to the manifold bar being determinative of the angle of divergence of the individual sets of tines, and a prop disposed further from the manifold being determinative of the ultimate spacing of the tine tips. Where necessary or desirable, the props may be physically attached to the tines, as by weaving a suitably binding filament(s). In the alternative, where the rake of this invention is molded, the props may be suitably molded along with the tines and the manifold bar(s).

Other and additional variants of this invention will present themselves from a consideration of this specification. The only limits on the scope of this invention, however, shall be as a function of the claims appended hereto.

What is claimed is:

1. A rake comprising a handle means, a multiplicity of rows of tines extending from said handle, and means to attach said tines to said handle;

wherein each tine has a first end which is proximate and attached to said attachment means and a second end which is remote from said attachment means and is adapted to contact a surface intended to be raked;

wherein the second tine ends of at least some of the tines in a row of tins are spaced from the second tine ends of the next adjacent tines in the next adjacent row of tines both sidewise and front to back;

wherein the second end of at least some of the tines in one of said rows of tines have lengths and are arranged so as to be adapted to contact the surface intended to be raked, when said rake is in a normal operating position;

wherein the second ends of tines in the next adjacent row of tines are adapted to contact said surface intended to be raked only upon pressure being exerted on said first row of tines against said surface; and wherein the second ends of at least some of the tines in a row of tines extend from said attachment means substantially the same distance as the second ends of the next adjacent tines in the next adjacent row of tines.

2. A rake as claimed in claim 1 including a single manifold bar attached to said handle means and having said multiplicity of rows of tines extending therefrom in substantially the same direction.

3. A rake as claimed in claim 1 including a separate manifold bar attached to said handle means for each row of tines.

4. A rake as claimed in claim 2 wherein said all of the tines in the same row are substantially parallel to each other.

5. A rake as claimed in claim 2 wherein at least some the tines of at least one of the rows of the tines extending from said bar are substantially fan shaped.

6. A rake as claimed in claim 1 comprising two rows of tines.

7. A rake as claimed in claim 1 wherein the tines of at least one of said rows of tines are substantially coplanar.

8. A rake as claimed in claim 1 wherein at least some of the tines of one row are disposed in the spaces between the tines of a next adjacent row.

9. A rake as claimed in claim 8 wherein the multiple rows of tines extend from said manifold bar at a small divergent angle with respect to each other.

10. A rake as claimed in claim 1 containing a spreader between and substantially transverse to adjacent rows of tines.

11. A rake as claimed in claim 1 wherein said handle means is a single rod shaped element.

12. A rake as claimed in claim 1 wherein all of the tines are of substantially the same length.

13. A rake as claimed in claim 1 wherein a row of tines comprises a center region and two outward regions, and wherein the tines in said outward region of said row are longer than the tines in said center region.

14. A rake as claimed in claim 1 wherein said remote ends of the tines in a row of tines are substantially coplanar.

15. A rake as claimed in claim 1 wherein said remote ends of the tines in a row of tines are substantially coplanar in a front to back direction.

16. A rake as claimed in claim 1 wherein the remote end of a tine in one row of tines is front to back displaced from the remote end of the tines next adjacent thereto in the next adjacent row.

17. A rake as claimed in claim 1 wherein the remote ends of all of the tines in one row of tines are in a plane which is front to back displaced from the plane of the remote ends of the tines in the row of tines which is next adjacent thereto.

18. A rake as claimed in claim 1 wherein all of the tines are of all of the rows are of substantially the same length.

* * * * *